United States Patent [19]

Umeda

[11] 4,414,938

[45] Nov. 15, 1983

[54] ROTARY INTERNAL COMBUSTION ENGINE

[76] Inventor: Soei Umeda, 10-14, 3-chome, Mitsuyaminami, Yodogawa-ku, Osaka-shi, Japan

[21] Appl. No.: 236,289

[22] Filed: Feb. 19, 1981

Related U.S. Application Data

[63] Continuation-in-part of Ser. No. 37,333, May 9, 1979, abandoned.

[30] Foreign Application Priority Data

Aug. 25, 1978 [JP] Japan .............................. 53-104302

[51] Int. Cl.³ .............................................. F02B 53/00
[52] U.S. Cl. .................................... 123/229; 123/230; 418/150; 418/263
[58] Field of Search ............... 123/229, 230, 231, 235, 123/236; 418/150, 258, 255, 260, 261, 263, 265

[56] References Cited

U.S. PATENT DOCUMENTS

| | | | |
|---|---|---|---|
| 727,434 | 5/1903 | Pettengill | 418/260 X |
| 973,833 | 10/1910 | Wilber | 123/230 |
| 1,255,865 | 2/1918 | Doane | 123/235 |
| 1,859,618 | 5/1932 | Cleland | 123/229 |
| 2,162,851 | 6/1939 | Lister | 123/230 X |
| 2,359,903 | 10/1944 | Fanning | 418/255 |
| 4,133,617 | 1/1979 | Reynaud | 418/150 |

FOREIGN PATENT DOCUMENTS

| | | | |
|---|---|---|---|
| 251816 | 10/1912 | Fed. Rep. of Germany | 418/255 |
| 655604 | 1/1938 | Fed. Rep. of Germany | 123/230 |
| 588042 | 1/1925 | France | 123/230 |
| 44-39365 | 6/1969 | Japan | 123/229 |
| 52-1216 | 1/1977 | Japan | 123/230 |

Primary Examiner—Michael Koczo
Attorney, Agent, or Firm—Wenderoth, Lind & Ponack

[57] ABSTRACT

A rotary type internal combustion engine including a cylindrical rotor having a diametrical slot parallel with the longitudinal axis of the rotor and a vane movably mounted in the vane groove and constituted by two vane parts opposed to each other at the center of the vane in the radial direction thereof. The rotor is rotatably mounted in a housing having an internal chamber with a lower inner wall part with a cross-sectional shape of part of a circle and with which the rotor is coaxially rotatable in close contact therewith, and an upper inner wall part with a cross-sectional shape of part of an approximately elliptical shape and the center of which is offset from the center of the circular cross-sectional shape in a direction away from the lower inner wall part, the approximately elliptical shape having a constant diameter through the center of the circular cross-sectional shape, the vane having a diametrical dimension equal to the constant diameter and the upper inner wall part being at least the part of the entire inner wall which is on the side of the center of the circular cross-sectional shape in the direction of offset of the center of the elliptical shape, the radially outer ends of the vane parts engaging the inner wall of the upper inner wall part in substantially gas tight relation during rotation of the rotor. Vane guide chambers are provided at opposite ends of the internal chamber and have the approximately elliptical cross-sectional shape coaxial with the upper inner wall part of the housing, and vane guide portions on the opposite axial ends of the vane guides engage the inner walls of the vane guide chambers during rotation of the rotor.

3 Claims, 27 Drawing Figures

ROTARY INTERNAL COMBUSTION ENGINE

This application is a continuation-in-part of application Ser. No. 37,333, filed May 9,1979, now abandoned.

BACKGROUND OF THE INVENTION

This invention relates to a rotary type internal combustion engine wherein the cross-sectional shape of the internal wall of the housing has a greater part which is approximately elliptical and a smaller part which is circular. A rotor is rotatably fixed in said circular portion and a vane is fitted in a slot which extends diametrically through the center of said rotor. During operation, the interior of the elliptical portion of the housing is divided by said vane into two spaces in order that each induction, compression, ignition and combustion, and exhaustion will be performed twice each time said rotor makes two rotations.

OBJECTS AND BRIEF SUMMARY OF THE INVENTION

A first object of the invention is to provide an internal combustion engine capable of performing with only one housing a greater amount of work than the work performed by four cylinders of a conventional four-cycle reciprocating engine of equivalent size.

A second object is to provide an internal combustion engine which is smaller but performs the same work as that of a conventional internal combustion engine of equivalent size, and which can rotate at a higher speed.

A third object is to increase the capacity of the engine by causing the pressure of the burning fuel to act directly on a vane and by converting the pressure into the rotating force of a rotor.

A fourth object is to achieve a great saving in fuel.

A fifth object is to simplify the construction of such an engine.

A sixth object is to decrease the frequency of engine trouble in such an engine.

A seventh object is to provide an inexpensive internal combustion engine.

An eighth object is to provide an internal combustion engine the rotational vibration of which is reduced to a minimum and which can operate quietly.

The internal combustion engine of this invention achieves these objects and is so effective that one cylinder thereof can perform the work of four cylinders of a conventional four-cycle reciprocating engine of equivalent size. Because there is only one operating chamber, the rotary internal combustion engine of the invention is small as compared with a conventional rotary internal combustion engine, and thus effects a saving in fuel. Because pressure of the burning fuel acts directly on the vane of the motor of this invention and is effectively converted into the rotating force of the rotor, the capacity of the engine of this invention is very great. Because the engine of the invention has a simple construction, it hardly ever gets out of order. What is more, the engine of the invention is inexpensive.

BRIEF DESCRIPTION OF THE FIGURES

The invention will be described in greater detail with reference to the accompanying drawings, in which.

Figure 1:
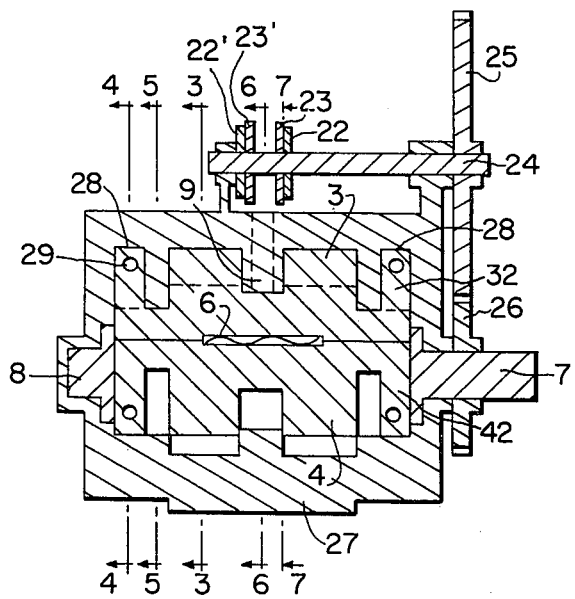
FIG. 1 is a longitudinal sectional view of the rotary engine according to the present invention.

A first embodiment of this invention will now be described in detail with reference to FIGS. 1–8H. In these figures, numeral 1 designates a housing. The cross-sectional shape of the inner wall of the housing 1 consists of an upper larger portion which is part of an ellipse with its minor axis extending in a vertical direction and of a lower portion which is part of a circle integrally connected to said ellipse. The numeral 2 designates a cylindrical rotor having different diameters at several points along the length thereof as can be seen from FIG. 2. A main rotor shaft 7 on one end of the rotor and a rear end shaft 8 on the other end are respectively rotatably supported so that the rotor rotates in close contact with the inner wall of said circular portion of said housing.

Figure 2:
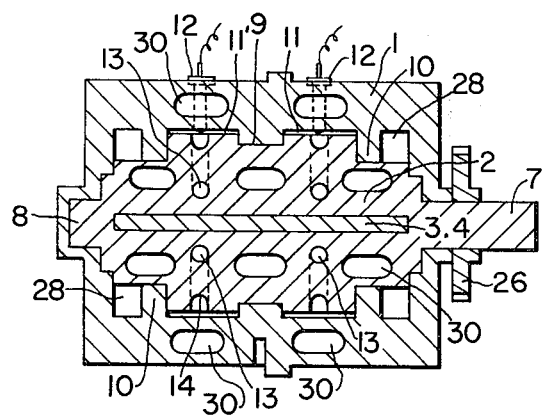
FIG. 2 is a longitudinal section taken at right angles to the section of FIG. 1.
Figure 3:
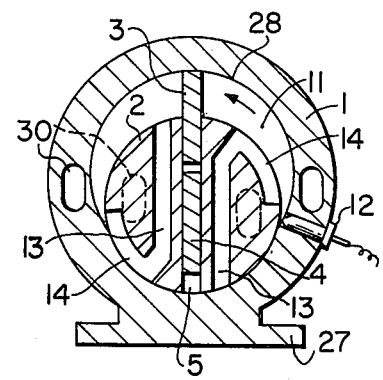
FIG. 3 is a sectional view on the line 3—3 of FIG. 1.
Figure 4:
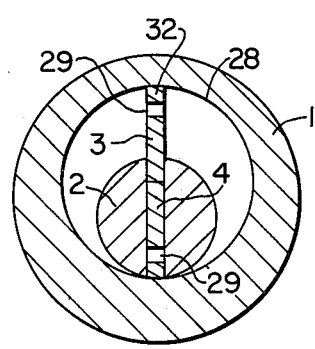
FIG. 4 is a sectional view on the line 4—4 of FIG. 1.
Figure 5:
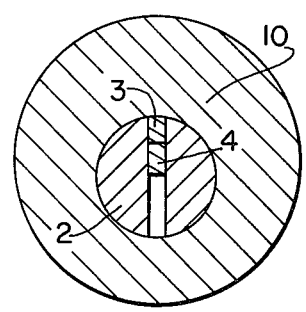
FIG. 5 is a sectional view on the line 5—5 of FIG. 1.
Figure 6:
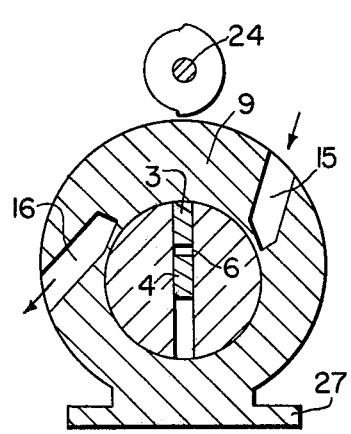
FIG. 6 is a sectional view on the line 6—6 of FIG. 1.
Figure 7:
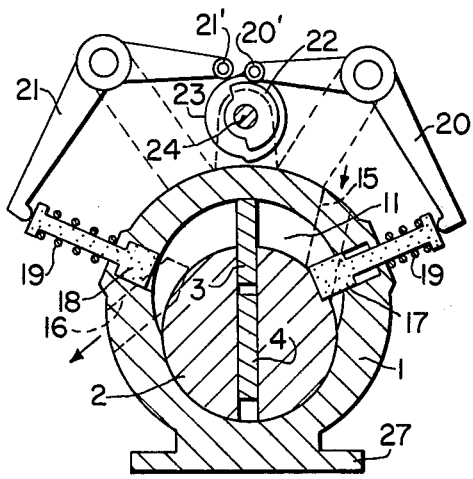
FIG. 7 is a sectional view on the line 7—7 of FIG. 1.
Figure 15A:
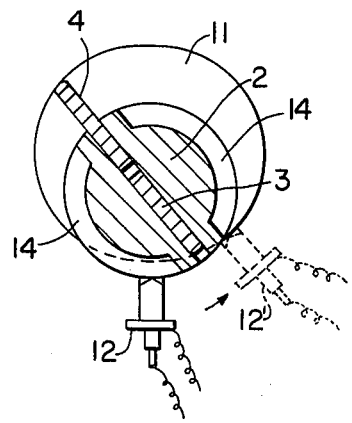
FIGS. 15A–15C are fragmentary sectional views of another embodiment of the engine according to the invention.
Figure 15B:
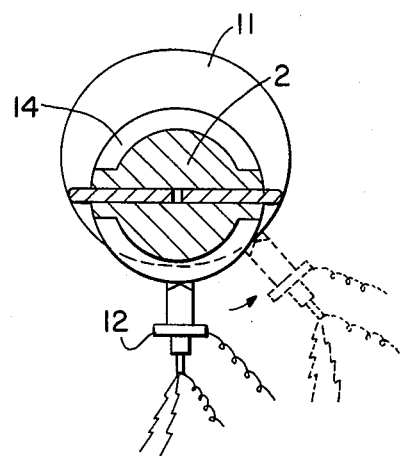
Figure 15C:
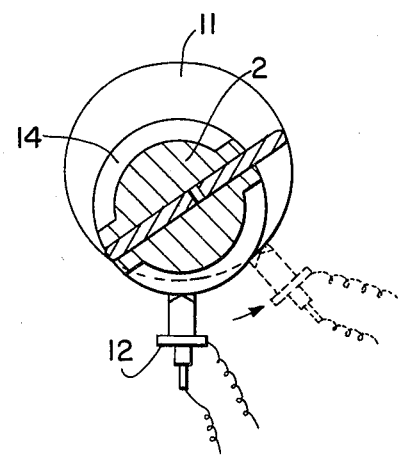

The numerals 3 and 4 designate vane means constituted by two vanes. Extending diametrically through the center of the rotor 2 is a slot 5 extending substantially the length thereof. The vanes 3 and 4 are fitted in said slot 5 and a plate spring 6 is positioned between the vanes. The vanes 3 and 4 are urged outwardly of the rotor by the plate spring 6 into sealing engagement with the internal wall of the housing 1. The numeral 9 designates a central annular wall which, as shown in FIGS. 1 and 2, divides the inside of the housing 1 into two symmetrical left and right portions. Intermediate walls 10 and 10' separate the operating chambers 11 and 11' from vane guide chambers 28. The vanes engage the intermediate walls 10 and 10' to seal the operating chambers. The operating chambers 11 and 11' are defined between the rotor 2 and the elliptical portion of the inner wall of the housing 1. During rotation of the rotor 2, the vanes 3 and 4 separate the operating chamber 11 into a first operating portion 32 and a second operating portion 33, as described hereinbelow with respect to FIGS. 8A-8H. The numerals 13 designate compressed gaseous fuel ports for each chamber and extending parallel with the slot 5 and in opposite directions relative to each other. The numerals 14 designate spark grooves at outer ends of the ports 13 and opening from the rotor at points diametrically opposite each other and extending around the outer surface of the rotor. At the end of the compression stroke of said first and second operating portions, a gaseous fuel charge is ignited by a spark plug 12 in the spark groove 14 which is opposed to it at that time. Alternatively, a spark groove 14 and the spark plug 12 can be provided in the positions as shown in FIGS. 15A-15C, and the fuel charge is ignited much better. In FIGS. 15A-15C, the numeral 12 designates a spark plug. The operation is otherwise the same as FIGS. 1-8H. Again referring to FIGS. 1-8H, an intake port 15 and an exhaust port 16 are respectively bored in the central wall 9 on opposite sides of the operating chambers 11 and 11' and open laterally into the respective chambers 11 and 11'. Flat, plate-like intake valves 17 open and close the lateral openings from intake port 15 for each chamber. The intake and exhaust valves 17 and 18 are made from a flat steel material and extend into the housing through slots which intersect the lateral openings from the ports 15 and 16. Compression springs 19 are placed between the outer surface of the housing 1 and the heads on the stems of the intake valves 17 and the exhaust valves 18, and operate to push the intake and exhaust valves 17 and 18 radially outwardly at all times, that is, in a direction to open the intake and exhaust ports. An intake valve lever 20 is provided for each intake valve and is pivotally mounted at the middle thereof on a support on the upper part of an external wall of the housing 1. Each intake valve lever 20 is mounted so that the forward end thereof presses on the head on the stem on the corresponding intake valve 17, and on the opposite end there is provided a roller 20'. Intake valve cams 22 and 22', one corresponding to the intake port in each chamber, are mounted on shaft 24 and are generally circular with portions cut out as shown in FIG. 7. The rollers 20' engage the cam surfaces of the intake valve cams 22. The rotation of said cams 22 and 22' causes the rollers 20' to drive the levers 20 against the force of the springs 19 so that the intake valves 17 are raised or lowered to thereby open or close the intake ports 15. Exhaust valve levers 21 are pivotally mounted in a similar way. Said exhaust valve levers 21 are mounted with the forward ends pressing on the heads of the stems of the exhaust valves 18, and opposite ends carry rollers 21'. Exhaust valve cams 23 and 23' are provided on the cam shaft 24. The rollers 21' move along the cam surfaces of the exhaust cams 23, and the exhaust valves 18 are similarly opened or closed. The valves are arranged so that when first and second operating portions 32 and 33 of a chamber are in the induction stroke, the intake valve 17 opens, and when they are in any other stroke, the intake valve 17 closes. Similarly when the first and second operating portions are in the exhaust stroke, the exhaust valve 18 opens, and when they are in any other stroke, the exhaust valve 18 closes. The induction, compression, ignition and exhaust strokes are carried out in turn in the operating chambers 11 and 11' which are separated by the central wall 9 and at a phase difference of one-half cycle with respect to each other.

A cam gear 25 is mounted on one end of the cam shaft 24 and meshes with a main shaft gear 26 which is fixed on the main shaft 7 of the rotor. The cam gear 25 rotates at half the speed of the main shaft 7 and in turn rotates the cam shaft 24 at half the speed of the rotor 4. The numeral 27 designates a mounting base, and the numeral 30 designates cooling water passages in the housing 1. The vane guide chambers 28 are on both ends of the housing 1 and the vane means has vane guide portions 32 and 42 on the opposite ends thereof rotatably slidable in the guide vane chambers. A plurality of air holes 29 are provided in the vane guides 32 and 42 within the vane guide chambers to allow the vane guides 32 and 42 to rotate more easily. The inner peripheral walls of the vane guide chambers have a cross-sectional shape of a full ellipse coaxial with and having the same elliptical dimensions as the elliptical part of the operating chamber 11.

Figure 14:
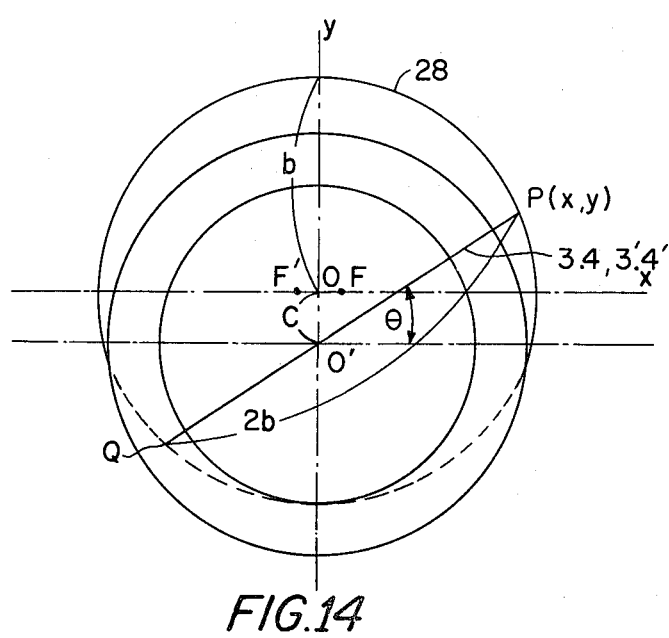
FIG. 14 is a diagram showing the relation among an operating chamber, a guide chamber and a vane of an engine according to the invention.

The equation for the shape of the elliptical portion of the operating chamber 11 and of the full ellipse of guide vane chambers 28 is as follows:

$$(b^2-c^2)x^2+b^2y^2=b^4 \tag{1}$$

Where x is the major axis of the elliptical portion and y is the minor axis, as shown in FIG. 14, 2b is the length of the minor axis and c is the distance between the center o and the center o' of the rotor. The distance c is the difference between the length y of the minor axis of the ellipse and the radius of the circular portion plus a predetermined amount.

Strictly speaking, however, the size of the elliptical portion as defined in Equation (1) can be made smaller in the direction of the diameter of the rotor 2 by the value $\delta$ in the following equation:

$$\delta = 2b\left\{\sqrt{1 + \frac{c^4\tan^2\theta}{(b^2 + b^2\tan^2\theta - c^2)^2}} - 1\right\} \tag{2}$$

Where $\theta$ is an angle between the vane PQ and the major axis of the elliptical portion. The angel $\theta$ is any angle between zero and $2\pi$ radians.

When this is done, the vane means 3, 4 which lies along line PQ will neither expand nor contract during rotation of the rotor, but rather will remain in close contact with the inner wall of the elliptical portion at all times during the rotation thereof, which is the ideal condition.

Figure 10:
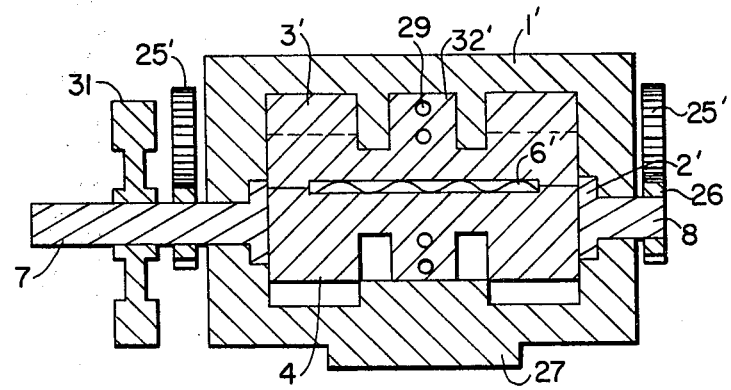
FIG. 10 is a longitudinal sectional view of the engine of FIG. 9.
Figure 11:
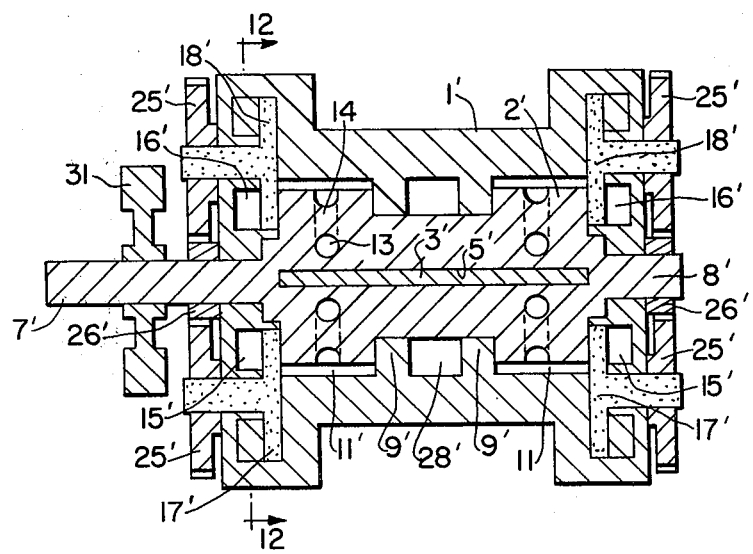
FIG. 11 is a sectional view on the line 11—11 of FIG. 9.
Figure 12:
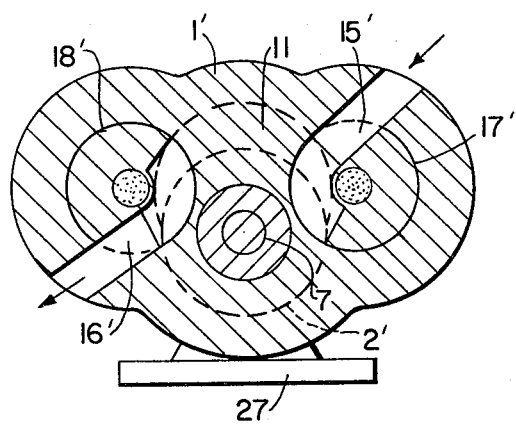
FIG. 12 is a sectional view on the line 12—12 of FIG. 11.

FIGS. 9 to 13D show another embodiment of intake and exhaust control means for the engine of the present invention. The numral 1' designates the housing, which has the same cross-sectional shape as the housing 1 in the first embodiment. A single elliptical vane guide chamber 28' is provided in the central part of the housing 1'. Intermediate walls 9' between the vane guide chamber 28' and the operating chambers 11 and 11', are provided as shown in FIG. 11. A rotor 2' rotates in close contact with the inner wall of the semicircular portion of the housing 1', and has a shape as shown in FIG. 11. The rotor 2' is a cylindrical rotor similar to rotor 2. A vane means is constituted by vanes 3' and 4' as shown in FIG. 10 which are fitted in the slot 5' extending through the center of the rotor 2' and has a plate spring 6' between the vanes 3' and 4'. Intake ports 15' and exhaust ports 16' are respectively provided in the housing 1' opening into the chamber 11 and 11' at the ends of the rotor 2'. Revolving intake valves 17' and revolving exhaust valves 18' are provided in recesses in the end walls of the housing 1'; each valve having the shape of a circle with a 90° sector-shaped opening therein. The valves cover the intake ports 15' and exhaust ports 16', respectively, and as the sector-shaped openings pass the intake and the exhaust ports, they open therein to permit a fresh charge of fuel to be sucked into the operating chambers 11' and to permit the exhaust gases to be exhausted out of the operating chambers.

Valve gears 25' are fixed to the shafts of the valves 17' and 18' and mesh with main shaft gears 26' fixedly on the ends 7' and 8' of the main shaft. The main shaft gears 26' and valve gears 25' reduce the speed of rotation of the main shaft to one-half. A plurality of openings 29 is provided in the vane guides 32' and 42' on the vanes 3' and 4'. A flywheel 31 is provided on the main shaft.

Figure 8A:
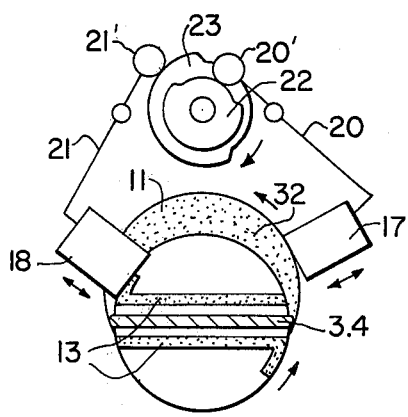
FIGS. 8A–8H are schematic views showing operating conditions of the engine.

The operating cycle of the engine will be described in detail. The operation of the first embodiment will be described with reference to FIGS. 8A to 8H. In FIG. 8A the vanes 3 and 4 are in the horizontal position in chamber 11 and on the intake cam 22, the roller 20' is against a reduced diameter portion of the intake cam 22, so that the force pressing the head of the stem on the intake valve 17 is not present, and the compression spring 19 urges the intake valve 17 to the position to open the intake port 15 in chamber 11 and gas is allowed to enter the operating chamber 11. The roller 21' for the exhaust valve is on a large diameter portion of the exhaust cam 23, so the exhaust valve 18 is closed.

Figure 8B:
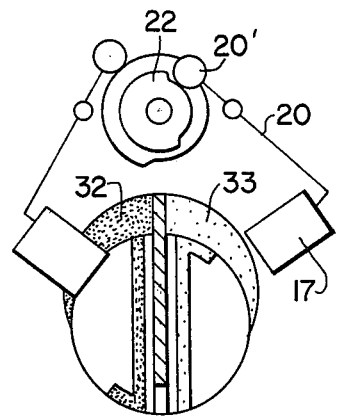

Next, when the rotor 2 makes a one-fourth of a revolution in the direction of the arrow to the position as shown in FIG. 8B, the compression stroke of the first operating portion 32 begins. Because the intake valve 17 remains open, the induction stroke of the second operating portion 33 begins.

Figure 8C:
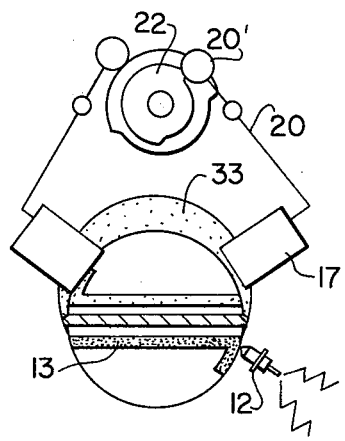

When the rotor makes a further one-fourth of a revolution to the position shown in FIG. 8C, the compressed gas in the first operating portion 32, now held in passage 13, is exposed at the spark groove 14 and is ignited by the spark plug 12 and burned. At this point the roller 20' leaves the small diameter portion of the intake cam 22 and the intake valve 17 pressed to the closed position, and the induction stroke of the second operating portion 33 ends. The gas ignited in FIG. 8C in the first operating portion 32 expands and pushes the vane to rotate the rotor 2.

Figure 8D:
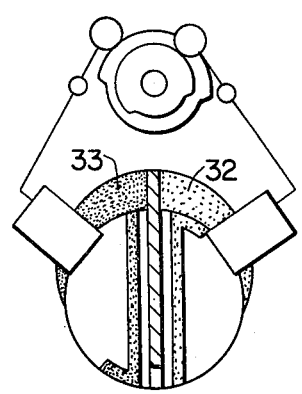

In FIG. 8D, due to the rotation of the rotor, the compression stroke of the second operating portion 33 begins.

Figure 8E:
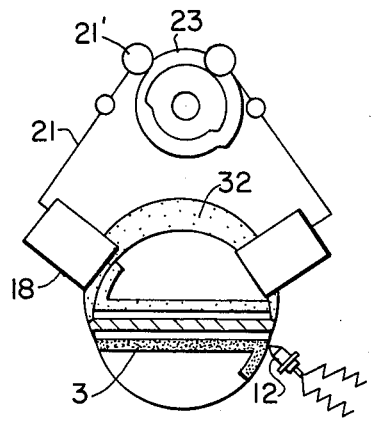

Further expansion of the burning gas in the first operating portion causes the rotor to make a one-fourth revolution to the position as shown in FIG. 8E. Then the gas compressed in the second operating portion 33 is compressed in passageway 13 and ignited by the spark plug 12 and burned. At this time the roller 21' on the exhaust valve lever 21 engages the reduced diameter portion of the exhaust valve cam 23, and so the force pressing on the head of the stem of the exhaust valve 18 at the end of the exhaust lever 21 is released. The compression spring 19 thus opens the exhaust valve 18, and the exhaust port 16 is opened, and the exhaust stroke of the first operating portions 32 begins.

Figure 8F:
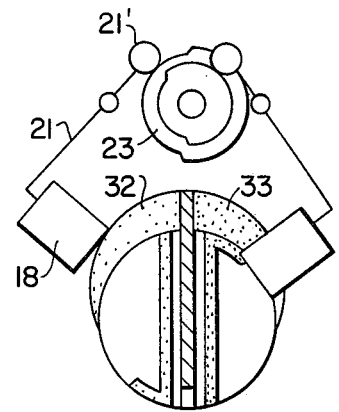
Figure 8G:
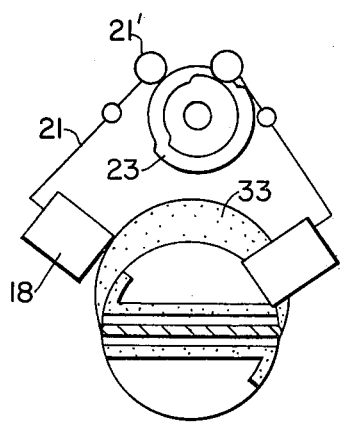

In the condition as shown in FIG. 8F, the gas ignited in the second operating portion 33 has expanded and pushed the vane to cause the rotor 2 to rotate one-fourth of a revolution. At this time the roller 21' is still on the reduced diameter portion of the exhaust cam 23, and so the exhaust port 16 is open, and the exhaust stroke of the first operating portion 32 continues.

The expansion stroke of the second operating portion 33 continues, and the rotor makes one-fourth a revolution to the position as shown in FIG. 8E.

Since the exhaust valve 18 remains open, the exhaust gas in the second operating portion is exhausted.

Figure 8H:
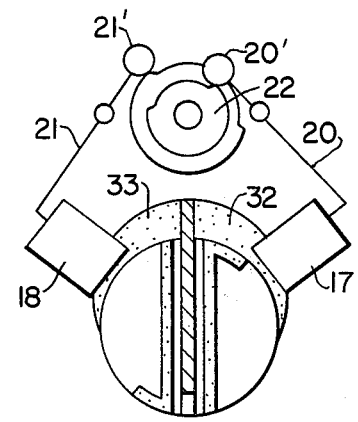
Figure 9:
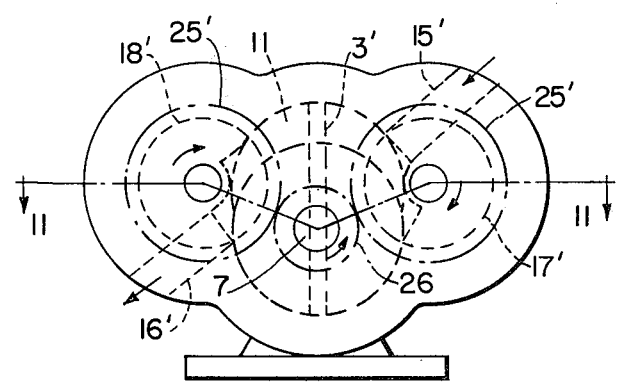
FIG. 9 is a front elevation of a modified embodimentof the rotary engine according to the invention.

The rotor makes a further one-fourth revolution to the position as shown in FIG. 8H. The roller 20' now engages the reduced diameter portion of cam 22 and so the force pressing the head of the valve stem of intake valve 17 is released, and the compression spring 19 raises the intake valve, and the intake port 15 is opened, and thereby the induction stroke of the first operating portion 32 begins again. On the other hand, the roller 21' on the exhaust valve lever 21 has not completely left the reduced diameter portion of cam 23 so that the exhaust port 15 is still open slightly, and the exhaust gas in the second operating portion 33 is exhausted. Thereafter the rotor returns to the position as shown in FIG. 8A to thereby complete one cycle of operation of the engine.

The other operating chamber 11' is at the same time operating in the order as shown in FIGS. 8E, 8F, 8H, 8A, 8B, 8C and 8D. This is achieved by rotationally offsetting cams 22' and 23' by 180° from cams 22 and 23. Because the operations of one operating chamber 11 are one-half cycle out of phase from those of the other operating chamber 11, the engine operates smoothly.

Figure 13A:
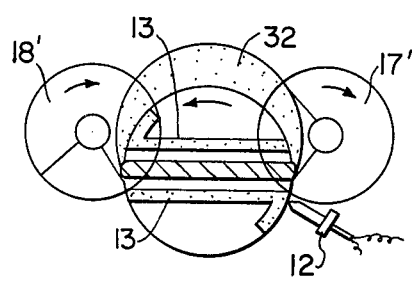
FIGS. 13A–13D are schematic views showing the operating conditions of the engine of FIGS. 9–12.
Figure 13B:
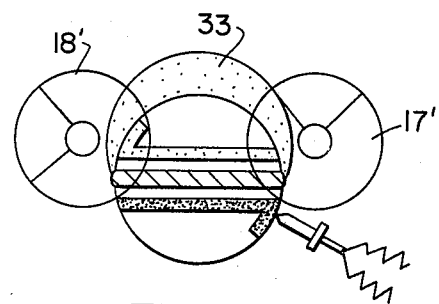

The operation of the second embodiment will be described with reference to FIGS. 13A–13D. In the condition as shown in FIG. 13A, the sector-shaped opening of the intake valve 17' is at the intake port 15' to start the induction stroke of the first operating portion 32 of chamber 11. In the condition as shown in FIG. 13B, the compressed gas in the first operating portion 32 is in the compression passage 13 and is ignited by the spark plug, and the induction stroke of the second operating portion 33 ends.

Figure 13C:
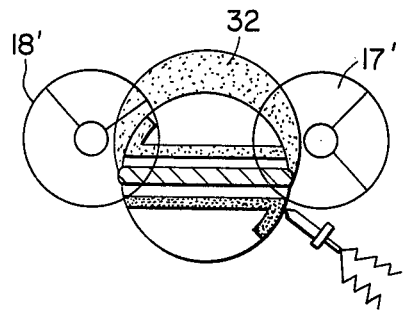

In FIG. 13C, the gas in the first operating portion 32 expands and because the sector-shaped opening in the exhaust valve 18' begins to open with the exhaust port 16, the exhaust stroke of the first operating portion begins, and the compressed gas in the second operating portion 33 is ignited.

Figure 13D:
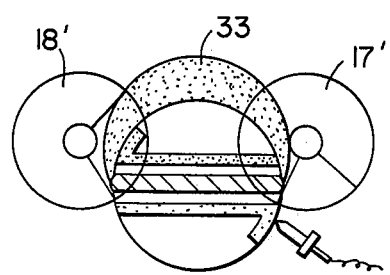

In FIG. 13D, the gas in the second operating portion 33 expands, and the exhaust stroke of the first operating portion 32 ends.

The operations of the other operating chamber 11 are at the same time in the order as shown in FIGS. 13C, 13D, 13A and 13B. The strokes of the left and right operating chambers 11 and 11' in this embodiment are thus also out of phase by one-half cycle, and so the engine operates smoothly.

As compared with a conventional rotary internal combustion engine, the operating chambers of the engine of this invention can be made smaller yet still produce the same amount of power. Because pressure of the burning gas is practically all converted to rotating energy, the engine of this invention has a higher output than conventional engines of the same or equivalent size and is very effective and contributes to a great saving in fuel. In addition, the engine of this invention vibrates hardly at all while rotating, and because the construction is simple, there is hardly any engine trouble, and also it is inexpensive. One operating housing of the engine of this invention can perform the work of four cylinders of a four-cycle reciprocating engine.

What is claimed is:

1. A rotary type internal combustion engine comprising:
    a cylindrical rotor having a diametrical vane groove parallel with the longitudinal axis of said rotor;
    a vane movably mounted in said vane groove and constituted by two vane parts opposed to each other at the center of the vane in the radial direction thereof;
    a housing having an internal chamber in which said rotor is rotatably mounted, said chamber having a lower inner wall part with a cross-sectional shape of part of a circle and with which said rotor is coaxially rotatable in close contact therewith, and an upper inner wall part with a cross-sectional shape of part of an approximately elliptical shape and the center of which is offset from the center of the circular cross-sectional shape in a direction away from said lower inner wall part, said approximately elliptical shape having a constant diameter through the center of said circular cross-sectional shape, said vane having a diametrical dimension equal to said constant diameter and said upper inner wall part being at least the part of the entire inner wall which is on the side of the center of the circular cross-sectional shape in the direction of offset of the center of the elliptical shape, the radially outer ends of said vane parts engaging the inner wall of said upper inner wall part in substantially gas tight relation during rotation of said rotor;

said housing further having vane guide chambers at opposite ends of said internal chamber and having said approximately elliptical cross-sectional shape coaxial with the upper inner wall part of said housing; and said vane having vane guide portions on the opposite axial ends thereof engaging the inner walls of said vane guide chambers during rotation of said rotor;

an annular wall extending into the elliptical portion substantially midway of the axial length of said chamber, and said vane having a recess therein into which said central annular wall projects and engaging said vane for guiding said vane; and means for intermittently permitting aspiration of a combustible gas into the part of the internal chamber within said upper inner wall part, for igniting and burning the gas for driving said vane and rotor, and exhausting the burned gas.

2. A rotary type internal combustion engine comprising:

a cylindrical rotor having a diametrical vane groove parallel with the longitudinal axis of said rotor;

a vane movably mounted in said vane groove and constituted by two vane parts opposed to each other at the center of the vane in the radial direction thereof;

a housing having an internal chamber in which said rotor is rotatably mounted, said chamber having a lower inner wall part with a cross-sectional shape of part of a circle and with which said rotor is coaxially rotatable in close contact therewith, and an upper inner wall part with a cross-sectional shape of part of an approximately elliptical shape and the center of which is offset from the center of the circular cross-sectional shape in a direction away from said lower inner wall part, said approximately elliptical shape having a constant diameter through the center of said circular cross-sectional shape, said vane having a diametrical dimension equal to said constant diameter and said upper inner wall part being at least the part of the entire inner wall which is on the side of the center of the circular cross-sectional shape in the direction of offset of the center of the elliptical shape, the radially outer ends of said vane parts engaging the inner wall of said upper inner wall part in substantially gas tight relation during rotation of said rotor;

said housing further having a central wall extending into the elliptical portion substantially midway of the axial length of said chamber and intermediate walls extending into said elliptical portion adjacent the opposite ends of said chamber for defining operating chambers between said central wall and said intermediate walls and defining guide vane chambers at the opposite ends of said internal chamber between said intermediate walls and the ends of said housing, said vane guide chambers having said approximately elliptical cross-sectional shape coaxial with the upper inner wall part of said housing; said vane having cut out portions at the positions of said central and intermediate walls, the vane portions between the cut out portions at the positions of the intermediate walls and the ends of said vane being vane guide portions on the opposite axial ends of said vane engaging the inner walls of said vane guide chambers during rotation of said rotor and in substantially gas-tight engagement with said central wall and intermediate walls during the rotation of said rotor for sealing said operating chambers; and means for intermittently permitting aspiration of a combustible gas into the part of the internal chamber within said upper inner wall part, for igniting and burning the gas for driving said vane and rotor, and exhausting the burned gas.

3. A rotary type internal combustion engine comprising:

a cylindrical rotor having a diametrical vane groove parallel with the longitudinal axis of said rotor;

a vane movably mounted in said vane groove and constituted by two vane parts opposed to each other at the center of the vane in the radial direction thereof;

a housing having an internal chamber in which said rotor is rotatably mounted, said chamber having a lower inner wall part with a cross-sectional shape of part of a circle and with which said rotor is coaxially rotatable in close contact therewith, and an upper inner wall part with a cross-sectional shape of part of an approximately elliptical shape and the center of which is offset from the center of the circular cross-sectional shape in a direction away from said lower inner wall part, said approximately elliptical shape having a constant diameter through the center of said circular cross-sectional shape, said vane having a diametrical dimension equal to said constant diameter and said upper inner wall part being at least the part of the entire inner wall which is on the side of the center of the circular cross-sectional shape in the direction of offset of the center of the elliptical shape, the radially outer ends of said vane parts engaging the inner wall of said upper inner wall part in substantially gas tight relation during rotation of said rotor;

said housing further having vane guide chambers at opposite ends of said internal chamber and having said approximately elliptical cross-sectional shape coaxial with the upper inner wall part of said housing; and said vane having vane guide portions on the opposite axial ends thereof engaging the inner walls of said vane guide chambers during rotation of said rotor;

said rotor having gas passages on opposite sides of said vane groove and extending through said rotor across a chord of the cross-section of said rotor and parallel to said vane groove, and said rotor further having spark grooves extending from one end of each of said gas passages and extending partially around the periphery of said rotor, said spark grooves being at the opposite ends of the respective gas passages and extending around the rotor in the direction away from said vane groove;

an ignition means in said lower inner wall part adjacent said upper inner wall part, each gas passage, when the spark groove is opposite said ignition means, having the other end closed by the lower inner wall part; and means for intermittently permitting aspiration of a combustible gas into the part of the internal chamber within said upper inner wall part, for igniting and burning the gas for driving said vane and rotor, and exhausting the burned gas.

* * * * *